United States Patent
Nam et al.

(10) Patent No.: US 9,965,621 B2
(45) Date of Patent: May 8, 2018

(54) PROGRAM PROTECTION DEVICE

(71) Applicant: INKA ENTWORKS, INC., Seoul (KR)

(72) Inventors: Jae Min Nam, Seoul (KR); Jung Geun Park, Gyeonggi-do (KR); Jun Ho Hong, Gyeonggi-do (KR); Jun Seok Oh, Seoul (KR); Jung Soo Kim, Seoul (KR)

(73) Assignee: INKA ENTWORKS, INC., Seoul (KR)

( * ) Notice: Subject to any disclaimer, the term of this patent is extended or adjusted under 35 U.S.C. 154(b) by 122 days.

(21) Appl. No.: 15/036,543

(22) PCT Filed: Nov. 3, 2014

(86) PCT No.: PCT/KR2014/010445
§ 371 (c)(1),
(2) Date: May 13, 2016

(87) PCT Pub. No.: WO2015/072688
PCT Pub. Date: May 21, 2015

(65) Prior Publication Data
US 2016/0300057 A1 Oct. 13, 2016

(30) Foreign Application Priority Data
Nov. 14, 2013 (KR) .................. 10-2013-0138634

(51) Int. Cl.
*H04L 29/06* (2006.01)
*G06F 21/52* (2013.01)
(Continued)

(52) U.S. Cl.
CPC .............. *G06F 21/52* (2013.01); *G06F 9/445* (2013.01); *G06F 21/14* (2013.01); *G06F 2221/034* (2013.01)

(58) Field of Classification Search
CPC ....................................................... G06F 21/52
See application file for complete search history.

(56) References Cited

U.S. PATENT DOCUMENTS 7,870,396 B2    1/2011    Kamei
9,767,297 B2 *   9/2017    Ely ........................ G06F 21/606
(Continued)

FOREIGN PATENT DOCUMENTS

JP           3033562      4/2000
JP      2007-148575      6/2007
(Continued)

OTHER PUBLICATIONS

International Search Report for PCT/KR2014/010445 (Applicant: Inka Entworks, Inc., Title: "Program Protection Device") dated Feb. 13, 2015, 4 pages.
(Continued)

*Primary Examiner* — Shawnchoy Rahman
(74) *Attorney, Agent, or Firm* — Nixon & Vanderhye P.C.

(57) ABSTRACT

Disclosed is a device for protection a program.

The device includes a protection domain unit including an encrypted protection domain, a start point display unit configured to display a start point of the encrypted protection domain, and an end point display unit configured to display an end point of the encrypted protection domain; and a protection domain connection unit including a decryption unit configured to generate a running code unit by decrypting the encrypted protection domain and a protection domain calling unit configured to call the running code unit.

5 Claims, 8 Drawing Sheets

(51) Int. Cl.
    *G06F 9/445*         (2018.01)
    *G06F 21/14*        (2013.01)

(56) References Cited

U.S. PATENT DOCUMENTS

| | | | | |
|---|---|---|---|---|
| 2003/0221116 | A1* | 11/2003 | Futoransky | G06F 21/125 |
| | | | | 713/189 |
| 2007/0053515 | A1* | 3/2007 | Kim | G11C 7/24 |
| | | | | 380/239 |
| 2007/0118763 | A1* | 5/2007 | Kamei | G06F 21/125 |
| | | | | 713/190 |
| 2012/0246487 | A1* | 9/2012 | Gu | G06F 21/14 |
| | | | | 713/190 |

FOREIGN PATENT DOCUMENTS

| | | |
|---|---|---|
| JP | 2010-231477 | 10/2010 |
| KR | 10-2013-0020861 | 3/2013 |

OTHER PUBLICATIONS

Written Opinion of the ISA for PCT/KR2014/010445 (Applicant: Inka Entworks, Inc., Title: "Program Protection Device") dated Feb. 13, 2015, 5 pages.

\* cited by examiner

PROGRAM PROTECTION DEVICE

This application is the U.S. national phase of International Application No. PCT/KR2014/010445 filed 3 Nov. 2014 which designated the U.S. and claims priority to KR Patent Application No. 10-2013-0138634 filed 14 Nov. 2013, the entire contents of each of which are hereby incorporated herein by reference.

BACKGROUND OF THE INVENTION

Field of the Invention

The present invention relates to a device for protecting a program.

Description of the Related Art

The following contents provide only background information related to the present embodiment but does not configure the related art.

Even if important logic or algorithm of a program is configured in binary codes, the important logic or algorithm of the program may be easily analyzed using a static analysis tool or a dynamic analysis tool. However, an anti-debugging function or an anti-dump function according to the related art may protect a program from the dynamic analysis tool such as a debugger but has a difficulty in preventing the analysis of program by using the static analysis tool.

Further, it is basically difficult to prevent in advance the analysis of program which uses the static analysis tool. In addition, after the program is analyzed by the static analysis tool, so that the important logic or algorithm of the program is leaked, since a user inevitably confirms later whether the program is modified to deal therewith later, it is not sufficient for protecting the important logic or algorithm of the program.

Accordingly, there is a need for a method of preventing the important logic or algorithm of the program from being analyzed by the dynamic analysis tool as well as the static analysis tool.

SUMMARY OF THE INVENTION

The present invention provides a device for protecting a program capable of preventing the program from being analyzed by a dynamic or static tool.

According to one aspect of this embodiment, in a device for protecting a program, the device includes a protection domain unit including an encrypted protection domain, a start point display unit configured to display a start point of the encrypted protection domain, and an end point display unit configured to display an end point of the encrypted protection domain; and a protection domain connection unit including a decryption unit configured to generate a running code unit by decrypting the encrypted protection domain and a protection domain calling unit configured to call the running code unit.

According to another aspect of this embodiment, in a method for protecting a program, the method includes generating a running code by decrypting an encrypted protection domain in binary codes of a program; running the generated running code; verifying the integrity of the running code; and removing the running code to return to the encrypted protection domain when the running of the running code is terminated.

As described above, according to the present embodiment, the important logic or algorithm of the program can be protected from a static analysis tool or a dynamic analysis tool. That is, binary codes are generated by compiling a program source code, and then at least one binary code including an important logic or algorithm of a program in a function may be encrypted, an encrypted protection domain may maintain an encryption state before being called even after the program is executed and loaded into a main memory, a running code may be generated and executed by decrypting the encrypted protection domain, and the binary code may be again returned to the encrypted state when the running of the running code is terminated. Accordingly, even if the static or dynamic analysis tool is used to attempt analyzing the program, the logic or algorithm of the encrypted binary code cannot be analyzed by using the static or dynamic analysis tool.

An encrypted protection domain in the binary code of program is decrypted to generate the running code only after the encrypted protection domain is called. Therefore, if the running of the running code is terminated by running the running code, the binary code may return to the encrypted state so that the encrypted state may be maintained except for the running of the running code. In this manner, if the program is maintained at an encrypted state, although memory state during the running of the program may be known by dumping a memory, the running code is encrypted, so that the important logic or algorithm of the program can be protected.

The present invention includes the important logic or algorithm of program and a start time point and an end time point for indicating a protection domain to be essentially protected. Accordingly, even if program is not run, a start time point and an end time point to be encrypted are searched from the binary code of program, and a corresponding part may be encrypted and replaced, so that the program may be distributed while applying security of the program, thus protecting the program from the static analysis tool.

Meanwhile, when the running performance of the program may be deteriorated by repeating decryption and encryption resulting from the frequent calling of the encrypted domain, the iterative encryption procedure may be reduced by storing the encrypted domain in a separate protection domain storage unit before decrypting the encrypted domain, and a decrypted state may be maintained, until a predetermined number of times according to the calling frequency of the encrypted protection domain. In addition, when a plurality of encrypted protection domains is included, it may be selected whether storing some encrypted protection domains in a separate protection domain storage unit or again encrypting the running code.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail.

Embodiments of the present invention are applicable to a program made by using all languages capable of generating a native code including a C/C++ programming language and are not limited to a specific operating system or hardware.

Figure 1:
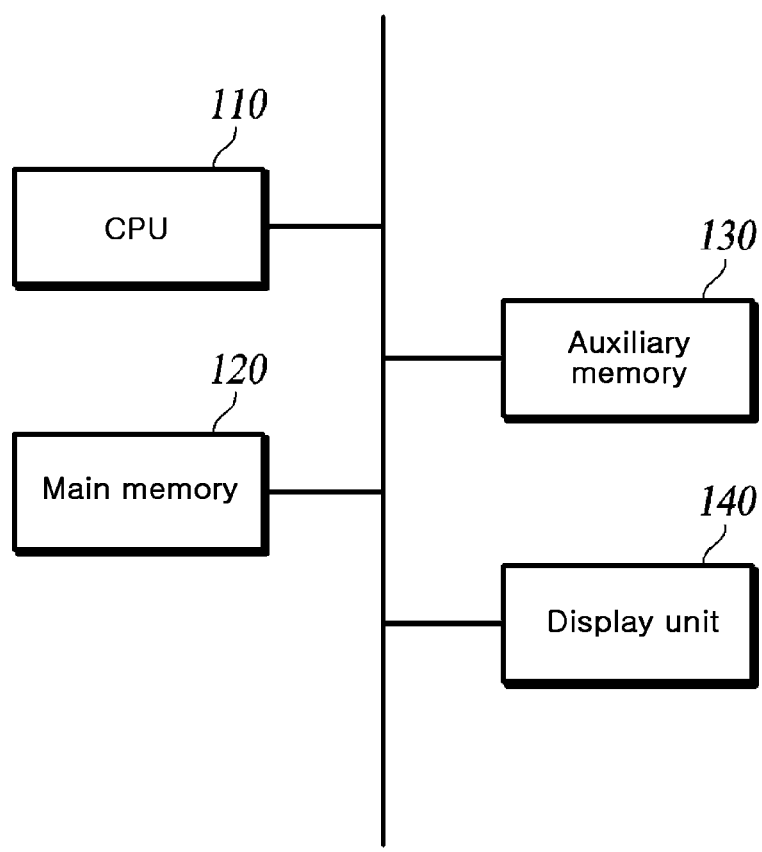
FIG. 1 is a block diagram illustrating an example of a computer for running a program.

FIG. 1 is a block diagram illustrating an example of a computer for running a program.

A computer 100 for running a program stores a program in an auxiliary memory 130. If the program runs, the program is loaded into a main memory 120, so that the program runs in a central process unit (CPU) 110 and a running result of the program is displayed on a display unit 140. When the program run in the computer 100 includes an encrypted protection domain which includes important logic or algorithm, the computer 100 may be used as a program protection device.

The program protection device according to an embodiment of the present invention may be a user terminal such as a personal computer (PC), a notebook computer, a tablet, a personal digital assistant (PDA), a game console, a portable multimedia player (PMP), a PlayStation portable (PSP), a wireless communication terminal, a smart phone, TV and a media player. The program protection device according to an embodiment of present invention may be a server terminal such as an application server and a service server. The program protection device according to an embodiment of the present invention may respectively refer to various devices provided with (i) a communication device such as a communication modem for performing communication with various devices or a wired/wireless communication network, (ii) a memory for storing data to execute the program, (iii) a microprocessor for performing computation and control by executing the program, and the like. In accordance with at least one embodiment, the memory may be a computer-readable recording/storage medium such as a Random Access Memory (RAM), a Read Only Memory (ROM), a flash memory, an optical disk, a magnetic disk, a solid state disk (SSD). In accordance with at least one embodiment, the microprocessor may be programmed to perform optionally at least one of operations and functions described herein. In accordance with at least one embodiment, the microprocessor may be implemented on the whole or on the part thereof by using hardware such as an application specific integrated circuit (ASIC) of a particular configuration.

Figure 2A:
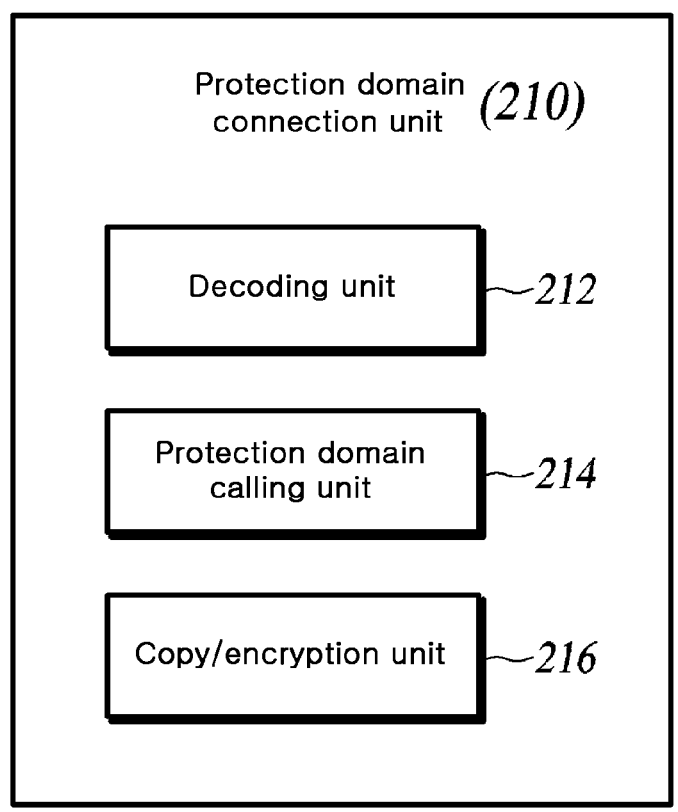
FIG. 2A is a block diagram illustrating the configuration of a protection domain connection unit according to an embodiment of the present invention.
Figure 2B:
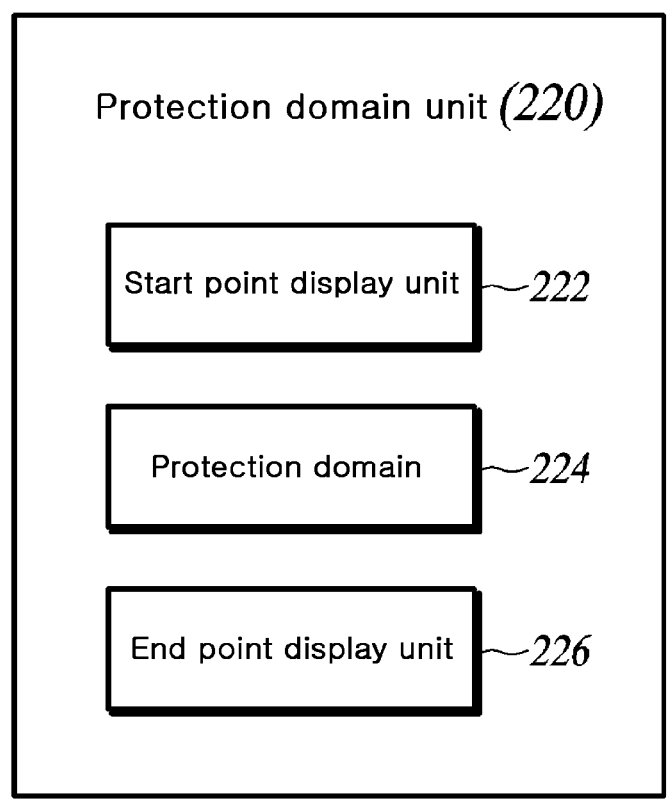
FIG. 2B and FIG. 2C are block diagrams illustrating the configuration of a protection domain unit according to an embodiment of the present invention.
Figure 2C:
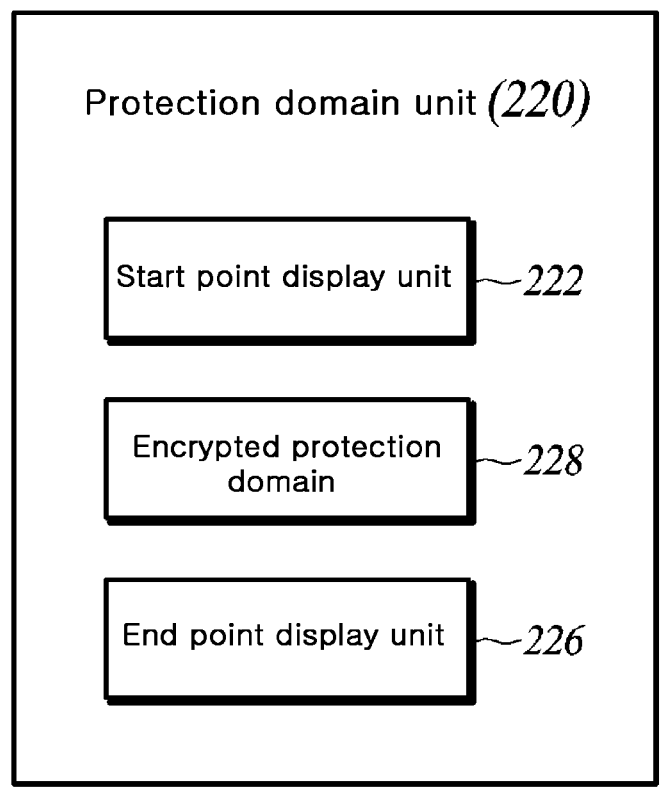

FIG. 2A is a block diagram illustrating a configuration of a protection domain connection unit according to an embodiment of the present invention. FIG. 2B and FIG. 2C are block diagrams illustrating a configuration of a protection domain unit according to an embodiment of the present invention.

As shown in FIG. 2A, the protection domain connection unit 210 includes a decryption unit 212, a protection domain calling unit 214, and a copy unit/encryption unit 216. As shown in FIG. 2B, the protection domain unit 220 includes a start point display unit 222, a protection domain 224, and an end point display unit 226. The protection domain unit 220 of FIG. 2B is in a state before compiling a program and performing encryption for applying security to the protection domain.

As shown in FIG. 2C, the protection domain unit 220 displays the state that a protection domain 224 is converted to an encrypted protection domain 228 by encrypting the protection domain 224 of FIG. 2B.

When the protection domain connection unit 210 and the protection domain unit 220 are configured by using a C/C++ programming language, the protection domain connection unit 210 and the protection domain unit 220 easily configure a library by using a macro function, so that development cost may be reduced.

It requires a complicated and professional technique but may be standardized to insert a label and a marking code displaying a start point and an end point for displaying a predetermined domain in binary codes of program, generate an running code by decrypting a part of an encrypted binary code during the running of the program, and call the running code for the running, thus the above procedure may be configured by a macro function.

The decryption unit 212 decrypts the encrypted protection domain 228 of the protection domain unit 220 to create a running code unit identical to the protection domain 224 being an original running code and replaces the encrypted protection domain 228 with the created running code unit. In this case, the decryption unit 212 may store the encrypted protection domain 228 in a separate place. The protection domain calling unit 214 calls the running code unit created by decrypting the encrypted protection domain 228 of the protection domain unit 220 by the decryption unit 212, so that the running code unit runs.

When the running of the running code is terminated, there is a need to return again the protection domain 224 to the encrypted state. If the encrypted protection domain 228 is stored in a separate place before decrypting the encrypted protection domain 228 by the decryption unit 212, the copy unit/encryption unit 216 may copy again the encrypted protection domain stored in the separate place to maintain the program in the encrypted state. When the encrypted protection domain 228 is not stored in a separate place, the running code unit may be encrypted again by the copy unit/encryption unit 216.

However, if the running code is encrypted again, in case the encrypted protection domain 228 is repeatedly called, the decrypting and encryption procedures are repeatedly performed, so that the running performance of program may be deteriorated. It is preferable to store the encrypted protection domain 228 in a separate place when the encrypted protection domain 228 is repeatedly called. In this case, the protection domain may be maintained in the encrypted state without a separate encryption procedure. In addition, even if the encrypted protection domain 228 is repeatedly called, it is possible to maintain a running code state within a predetermined number of times, thus minimizing the influence on performance.

The start point display unit 222 and the end point display unit 226 of the protection domain unit 220 display a start point and an end point of the protection domain, respectively. The start point display unit 222 and the end point display unit 226 may include a label and a marking code. The label is used to acquire an address of a start point and an address of an end point of a domain to be decrypted by the decryption unit 212 during the running of program. The marking code may be made in an assembly code without an influence upon the running of program. The marking code allows the start point and the end point of the protection domain 224 to be found in order to encrypt the protection domain 224 by using an encryption tool after compiling the source code of program.

Meanwhile, the encryption of the protection domain by the encryption tool is not limited to a platform of a specific form. Therefore, the encryption of the protection domain may be performed by a equipment for development, and also by a server. When the server performs the encryption, the equipment for development transmits a protection domain requiring encryption to the server to request the encryption and receives an encrypted result.

Figure 3A:
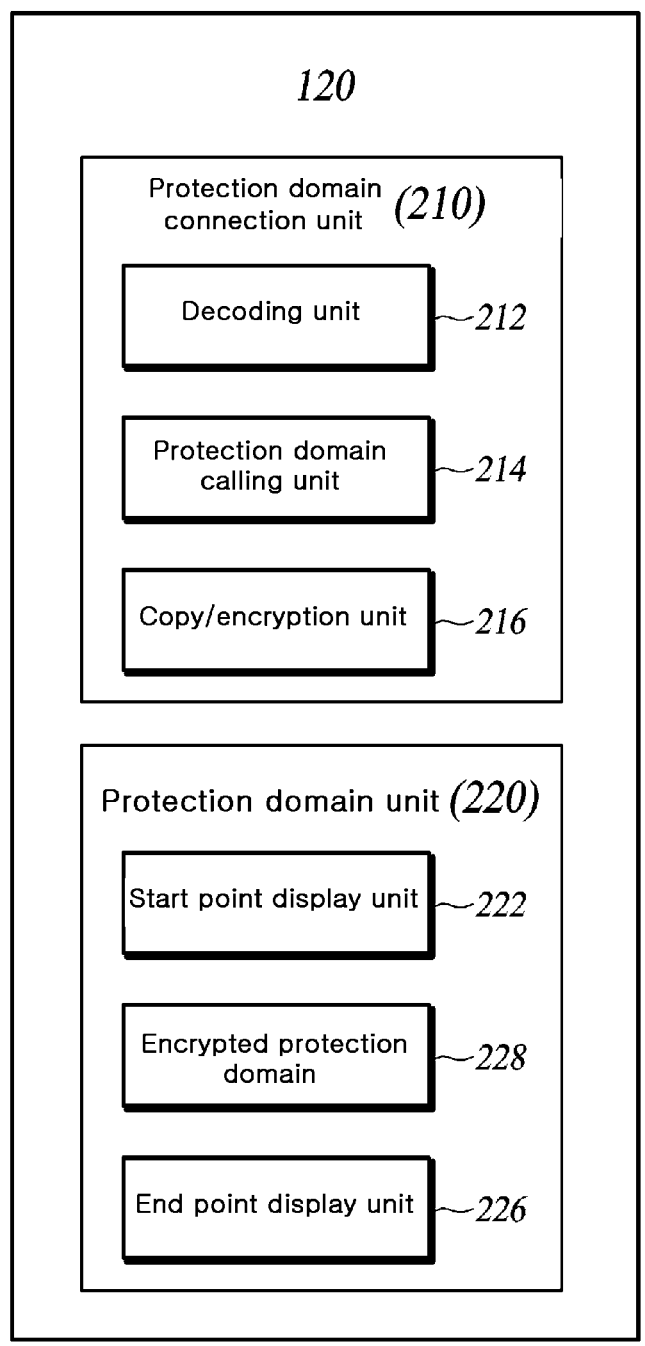
FIG. 3A and FIG. 3B are block diagrams illustrating a state that a program including an encrypted protection domain is loaded into a memory according to an embodiment of the present invention.
Figure 3B:
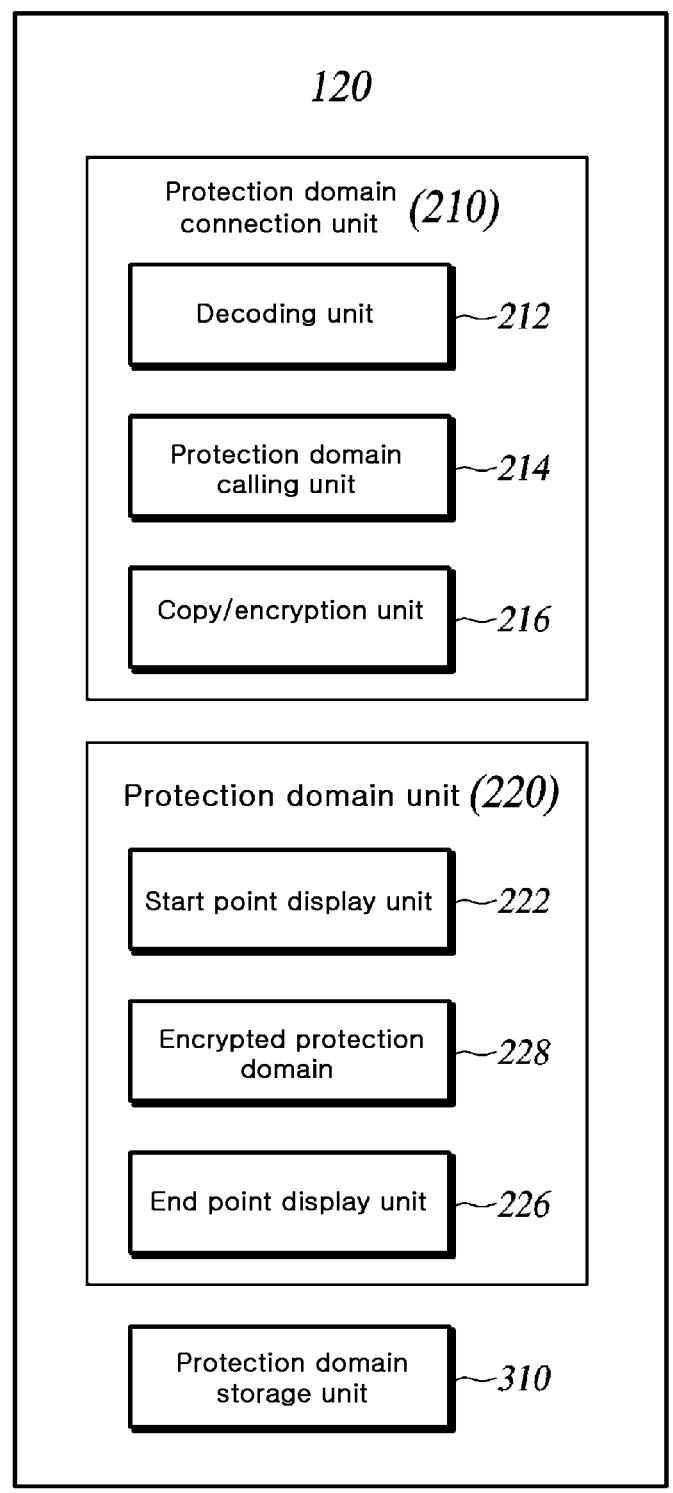

FIG. 3A and FIG. 3B are block diagrams illustrating a state that a program including an encrypted protection domain is loaded into a memory according to an embodiment of the present invention.

FIG. 3A is a block illustrating a state that a program including an encrypted protection domain and a protection domain connection unit 210 for connecting the encrypted protection domain is run into a main memory 120. The shape of FIG. 3A is maintained before the protection domain connection unit 210 calls the protection domain unit 220 and decrypts the encrypted protection domain 228 to create the running code unit.

FIG. 3B further includes a protection domain storage unit 310 in addition to a configuration of FIG. 3A.

As soon as a program is run, the protection domain storage unit 310 may be created. For example, before the decryption unit 212 decrypts the encrypted protection domain 228, the protection domain storage unit 310 may be created. Further, the encrypted protection domain 228 encrypted before decrypting the encrypted protection domain 228 may be stored in the protection domain storage unit 310. If the encrypted protection domain 228 is stored in the protection domain storage unit 310, the program may be returned again to an encryption state without the encryption procedure. Therefore, even when the protection domain unit 220 is frequently and repeatedly called, the influence on system performance due to encryption and decryption may be reduced.

Figure 4:
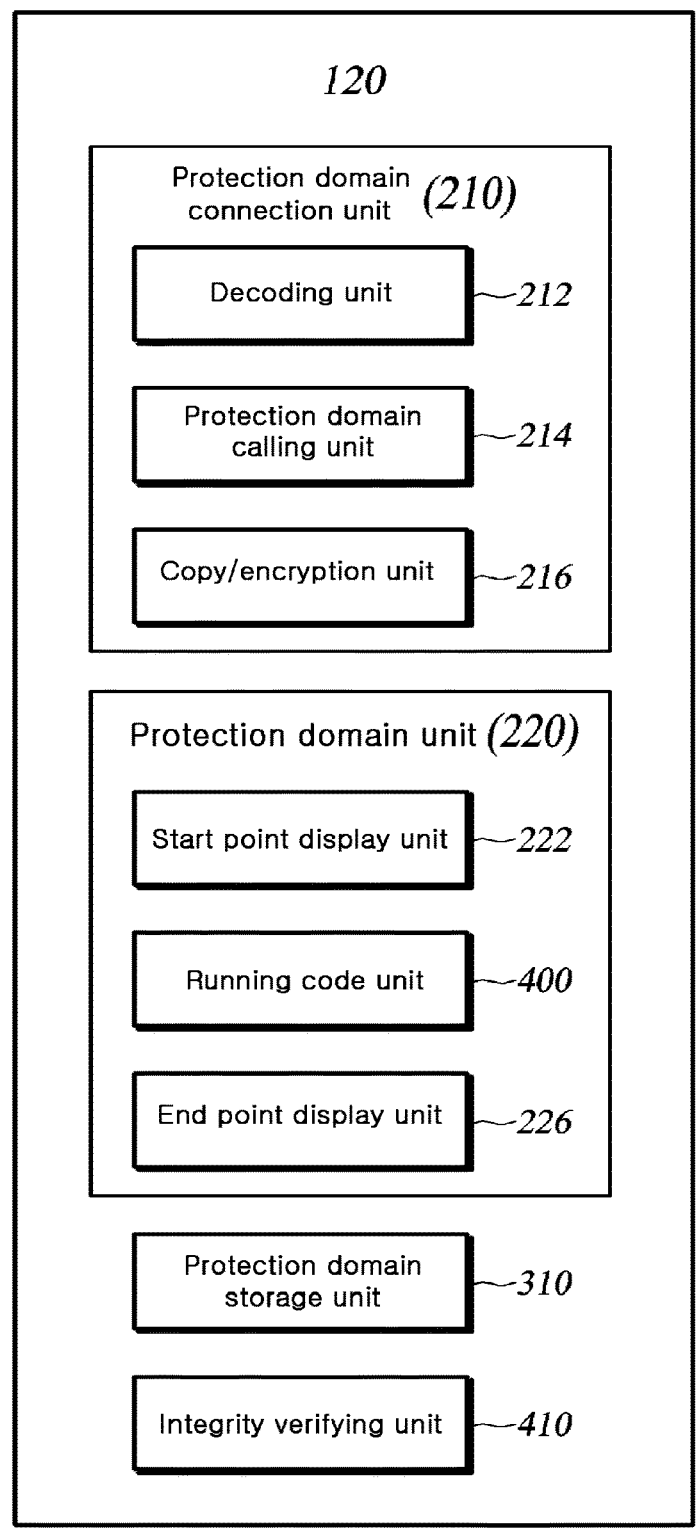
FIG. 4 is a block diagram illustrating a state that the integrity of a protection domain is verified after the protection domain is called according to an embodiment of the present invention.

FIG. 4 is a block diagram illustrating a state that the integrity of a protection domain is verified after the protection domain is called according to an embodiment of the present invention.

A program creates a running code unit 400 by decrypting an encrypted protection domain 228 to replace the encrypted protection domain 228 with the running code unit 400, and executes the running code unit 400. The running code unit 400 is in the same state as the code before the encrypted protection domain 228 is encrypted. An integrity verifying unit 410 verifies whether the running code unit 400 is modified during the running of the running code unit 400, immediately after the running of the running code unit 400 is terminated. In the present embodiment, the integrity verification method is described by using a hash function. However, the integrity verification method is not limited thereto, but is possible in various schemes.

In order to perform the integrity verification by using the hash function, a hash code for the protection domain 224 of FIG. 2B should be in advance extracted and be stored in a separate file or a program. The running code unit 400 is created by decrypting the encrypted protection domain 228 during the running of program and the encrypted protection domain 228 is replaced with the running code unit 400, and then the running code unit 400 is executed. After these procedures, a hash code is extracted by inputting a running code into the hash function immediately after the termination of the running of the running code unit 400 in order to confirm whether the running code is modified during the running of the running code unit 400. Then it is determined whether the extracted hash code corresponds to one of stored hash codes by comparing the extracted hash code with the stored hash code. As the determination result, when the extracted hash code differs from the stored hash code, the running code is modified during the running, so that the running of program stops. Since the hash function extracts a unique hash code according to an input value, the hash function may be used in the integrity verification. Various hash functions such as MD5, SHA, and Checksum may be used in the integrity verification.

Figure 5:
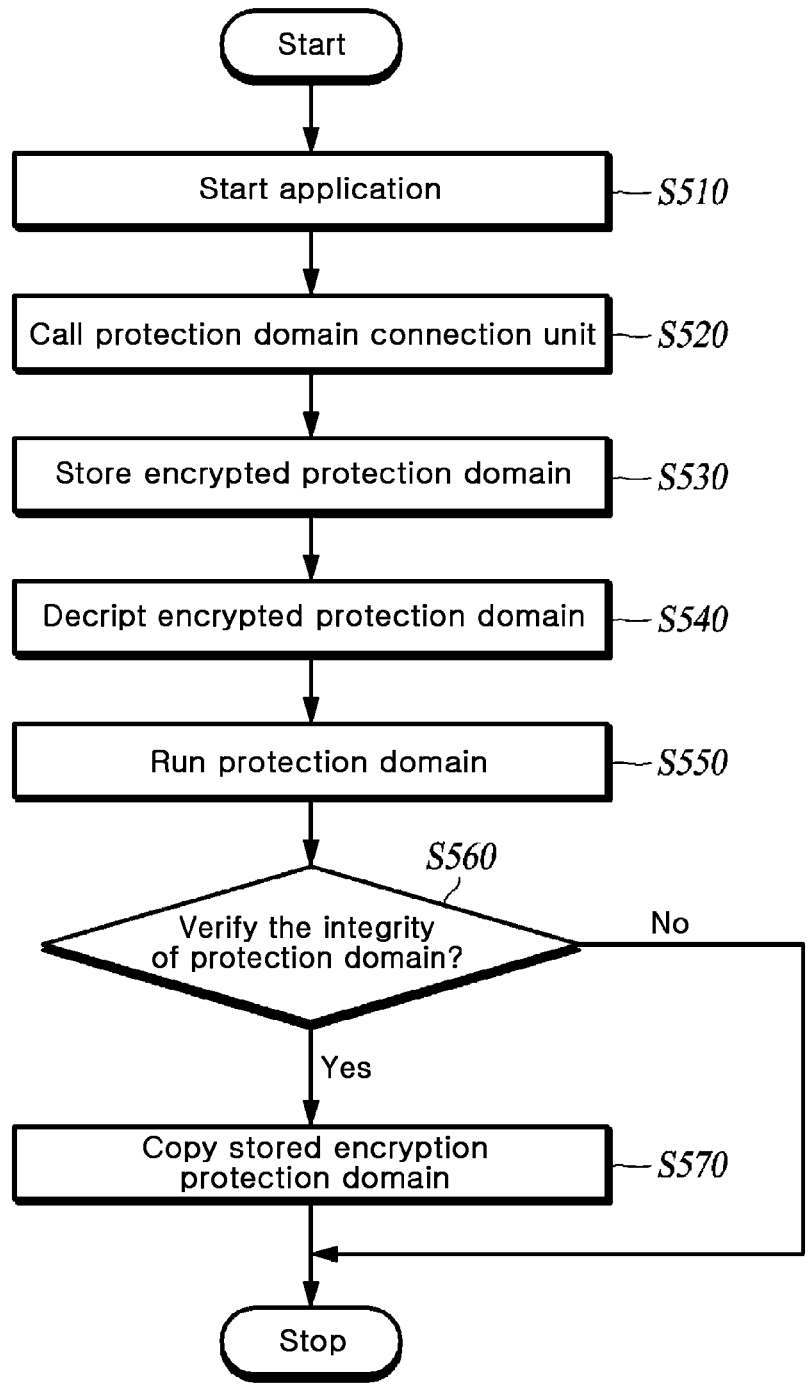
FIG. 5 is a flowchart illustrating a method for protecting a program according to an embodiment of the present invention.

FIG. 5 is a flowchart illustrating a method for protecting a program according to an embodiment of the present invention.

An application program is loaded into a main memory 120 and is run after the application program is stored in an auxiliary memory 130 (S510). When there is a need to call an encrypted protection domain 228 during the running of application program, a protection domain connection unit 210 is firstly called (S520). A decryption unit 212 stores the encrypted protection domain 228 in a protection domain storage unit 310 (S530). The encrypted protection domain 228 may be stored in the protection domain storage unit 310 but may not be stored. When the encrypted protection domain 228 is not stored, it must be encrypted after the running of a decrypted running code is terminated. The decryption unit 212 decrypts an encrypted protection domain (S540) and creates and runs a running code unit 400 identical to the protection domain 224 (S550).

An integrity verifying unit 410 verifies the integrity of a running code in order to confirm whether the running code is modified, immediately after the running of the running code is terminated (S560). If the program was modified, the running of program stops. The integrity verification may be performed through hash verification.

It is possible to extract a hash code and store the extracted hash code in a separate file or a program by inputting into a hash function a protection domain 224 of FIG. 2B which exists before the protection domain unit 220 is encrypted. In order to perform the integrity verification, a hash code is extracted by inputting into the hash function a running code created by decrypting an encrypted protection domain 228. Then it is determined whether the extracted hash code corresponds to one of stored hash codes. If the extracted hash code differs from the stored hash code, it is determined that the program is modified. When it is determined that the program is not modified, the copy unit/encryption unit 216 copies the encrypted protection domain stored in the protection domain storage unit 310 and stores it in an original location (S570).

The above description is simply to describe the technical concept of the embodiments by way of examples. Those skilled in the art of the embodiments may make various modifications, additions and substitutions, without departing from principles of this disclosure. Accordingly, the embodiments are intended for illustrating rather than for limiting the technical scope of this embodiment. The scope of the technical concept of the embodiments is not limited by the embodiments. The scope of the embodiment is to be interpreted by the following claims. All such modifications and variations are to be construed as being included within the scope of this embodiment.

What is claimed is:

1. A method for protecting a program, the method comprising:
 calling a protection domain connection unit including a decryption unit that decrypts an encrypted protection domain of a protection domain unit;
 generating with the decryption unit a running code by decrypting the encrypted protection domain of the protection domain unit among binary codes of a program and determining whether to store the encrypted protection domain in a protection domain storage unit;
 running the generated running code;
 verifying integrity of the running code; and
 removing the running code to return to the encrypted protection domain when the running of the running code is terminated;
 wherein the determining whether to store the encrypted protection domain in a protection domain storage unit comprises:
 when a plurality of encrypted protection domains exist, selecting whether to store the encrypted protection domain in a protection domain storage unit or to encrypt the running code after generating the running code corresponding to the encrypted protection domain without storing the encrypted protection domain in the protection domain storage unit, based on respective calling frequencies of the encrypted protection domains.

2. The method of claim 1, wherein the removing the running code to returning to the encrypted protection domain comprises copying the encrypted protection domain stored in a separate place when the encrypted protection domain is stored in the separate place or encrypting the running code.

3. The method of claim 1, wherein the protection domain unit includes a start point display unit to display a start point of the encrypted protection domain, and an end point display unit to display an end point of the encrypted protection domain; and
 wherein the start point display unit and the end point display unit comprise:
 a label to acquire an address of each point when the program is run; and
 a marking code to search a start point and an end point of a protection domain to be encrypted without an influence upon the running of the program.

4. The method of claim 3, wherein the encrypted protection domain is acquired by encrypting binary codes from a marking code included in the start point display unit to a marking code included in the end point display unit after binary codes of the program are generated.

5. The method of claim 1, wherein the verifying the integrity of the running code extracts a hash code by inputting the running code unit into a hash function, determines whether the extracted hash code corresponds to one of stored hash codes, and stops the running of the program when the extracted hash code differs from the stored hash code.

* * * * *